(12) United States Patent
Godde

(10) Patent No.: US 8,777,607 B2
(45) Date of Patent: Jul. 15, 2014

(54) MOLD INCLUDING A LOCKING DEVICE

(75) Inventor: Sébastien Godde, Hauteville-Lompnes (FR)

(73) Assignee: Compose SAS (FR)

( * ) Notice: Subject to any disclaimer, the term of this patent is extended or adjusted under 35 U.S.C. 154(b) by 0 days.

(21) Appl. No.: 12/747,973

(22) PCT Filed: Dec. 15, 2008

(86) PCT No.: PCT/EP2008/067566
§ 371 (c)(1),
(2), (4) Date: Sep. 8, 2010

(87) PCT Pub. No.: WO2009/077508
PCT Pub. Date: Jun. 25, 2009

(65) Prior Publication Data
US 2010/0330227 A1    Dec. 30, 2010

(30) Foreign Application Priority Data
Dec. 14, 2007  (EP) ..................................... 07305001

(51) Int. Cl.
*B29C 33/20* (2006.01)
(52) U.S. Cl.
USPC ........................................ 425/595; 425/45.19
(58) Field of Classification Search
USPC .................. 425/589, 595, 450.1, 451.9
See application file for complete search history.

(56) References Cited

U.S. PATENT DOCUMENTS

| 3,195,186 | A | * | 7/1965 | Gauban et al. | 425/595 |
| 3,324,936 | A | * | 6/1967 | Bauer | 164/314 |
| 4,867,938 | A | * | 9/1989 | Schad et al. | 425/595 |
| 5,078,202 | A | * | 1/1992 | Bai | 164/342 |
| 5,375,991 | A | * | 12/1994 | Rydmann et al. | 425/595 |
| 6,832,908 | B2 | * | 12/2004 | Schaefer | 425/595 |

FOREIGN PATENT DOCUMENTS

| DE | 2346632 | * | 4/1974 |
| JP | 08-1741 | * | 1/1996 |
| JP | 10-180778 | * | 7/1998 |

* cited by examiner

*Primary Examiner* — James Mackey
(74) *Attorney, Agent, or Firm* — Quarles & Brady LLP

(57) ABSTRACT

The invention relates to a mold (1) for molding, in particular by injection, that comprises two half-molds (2, 3) each defined by a side surface (21, 31), a front face and a rear face. One at least of said two half-molds is to be associated with means for opening and closing the mold. The two half-molds can be brought into contact at the level of a junction plane (1) when the mold is in the closed position. The mold is characterized in that one half-mold is provided with a locking device (6) that comprises: at least one latch (7) that can be simultaneously housed in a recess (25) in each half-mold (2, 3); and at least one independent system (8) capable of bringing together or separating the latch (7) and the recesses (25, 35) in which the latch (7) is to be received, and including one or more jack(s) (8) including a chamber connected to the half-mold, a piston capable of movement in said chamber, and a rod connected to the piston and to which the latch is attached.

6 Claims, 7 Drawing Sheets

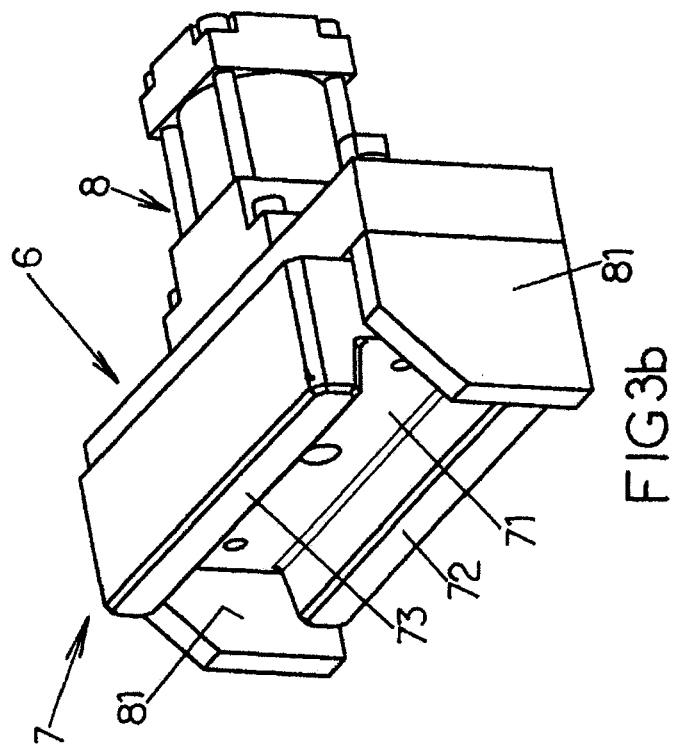
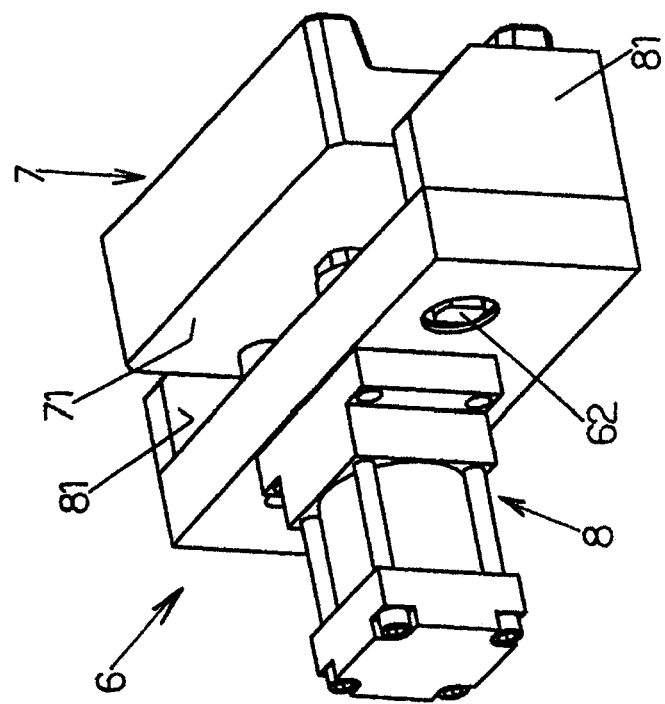

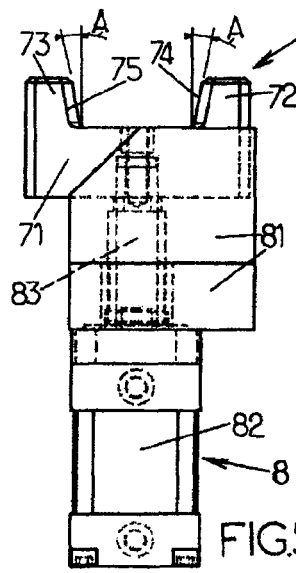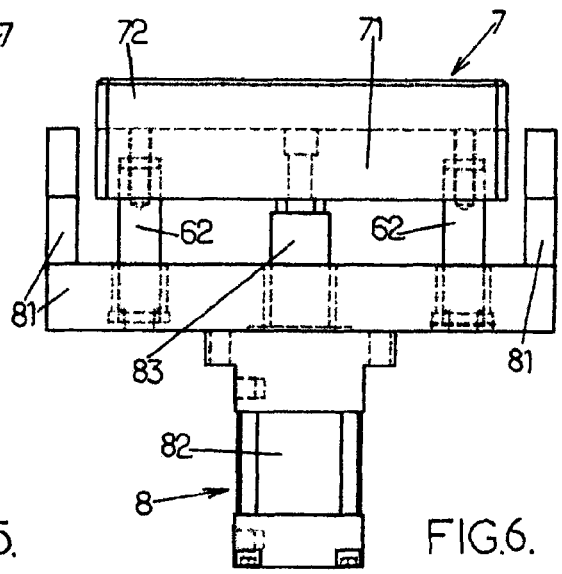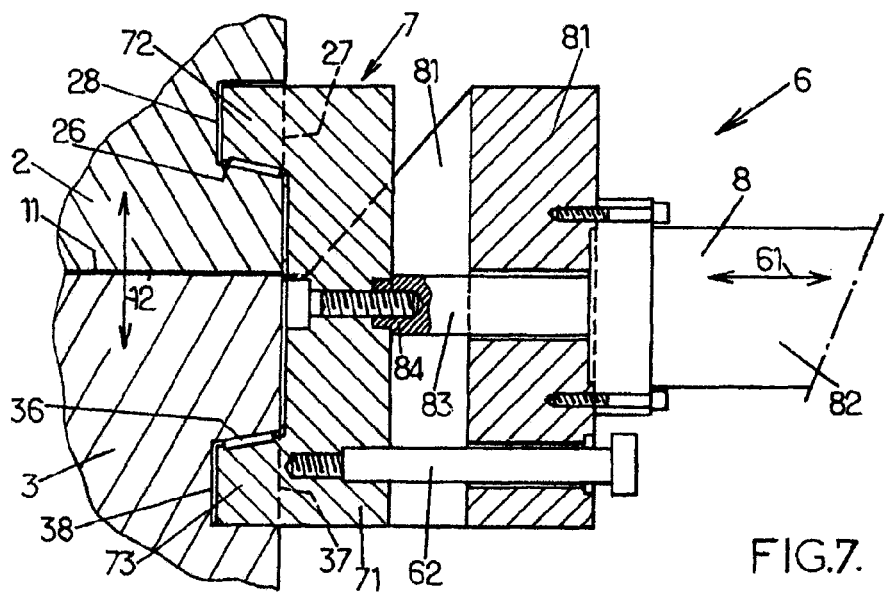

MOLD INCLUDING A LOCKING DEVICE

FIELD OF THE INVENTION

The invention belongs to the field of tools for manufacturing molded parts, particularly by injection. In particular, the subject of the invention is a device for locking a mold.

TECHNICAL BACKGROUND

There are several techniques for molding parts, particularly made of plastics, composites or metal.

Injection molding has been a known practice for a long time. Two half-molds are brought toward one another and come into contact along a parting line. Then the material to be molded is rapidly injected into the mold. Since the half-molds are adjacent, it is possible to provide inside the cavity zones around which the injected material can spread. Once the mold is full, the injection continues in order to ensure a correct filling of the mold and to take account of the shrinkage of the material during cooling. However, this additional filling requires the application of a considerable counter-pressure on the half-molds in order to prevent the two half-molds from separating under the effect of the injection pressure. The separation of the half-molds would result "at best" in the appearance of burrs along the parting line, which is totally intolerable.

To prevent this problem, it is known practice to apply a counter-pressure to one of the half-molds with the aid of a press. The thinner the part and the greater its projected area, the greater the locking force the press must apply. Moreover, it is often preferable for the dimensions of the press to allow the application of a counter-pressure greater than the value that is in theory strictly necessary.

In reality, the manufacturer of molded parts—the "transformer"—usually has a fleet of presses in a given range of locking force. Depending on the counter-pressure necessary to manufacture the part, he chooses one of the presses from his fleet and installs the mold therein. Hitherto, the presses used have usually been powerful enough.

In order to remedy this pressure problem, the injection-compression molding technique has been developed. This involves placing a certain quantity of material to be molded in a first half-mold while bringing a second half-mold toward the first. Under the effect of the pressure, the slug of material is spread out inside the mold, between the two half-molds, and it closely matches the cavity thus defined.

However, this technique makes it impossible to provide openings at the parting line of the two half-molds. To obtain a part comprising openings, it is necessary to provide steps for cutouts in the molded part in order to make the desired openings.

Therefore, the quality of finish is not always satisfactory both from the point of view of the surface appearance of the molded parts and from the point of view of the cutouts to be made.

BRIEF DESCRIPTION OF THE INVENTION

One objective of the invention is to propose a mold that makes it possible to mold parts by using a press of which the locking force is much less than that which is necessary when a mold is used that is not fitted with a locking device according to the invention. Such a locking device should therefore make it possible to produce molded parts with a complex three-dimensional structure which make it necessary to apply a high counter-pressure to the mold, by using a press of which the locking force would normally be insufficient if such a locking device were not used.

Accordingly, a variant of the invention consists of a mold for molding, particularly by injection. The mold comprises two half-molds each of them being defined by a side surface, a front face and a rear face. At least one of the two half-molds is designed to be associated with means for carrying out the opening and the closure of the mold. The two half-molds are capable of coming into contact at a parting line when the mold is in the closed position. The mold is characterized in that a half-mold is fitted with at least one locking device comprising:

at least one latch capable of being housed simultaneously in a recess of each half-mold, at least one standalone system capable of bringing the latch toward or away from the recesses in which the latch is to be housed.

Preferably, this standalone system comprises one (or more) cylinder(s) which are optionally self-locking. The (or each) latch comprises a chamber coupled to a half-mold (the one or ones fitted with at least one locking device), a piston capable of moving in said chamber and a rod secured to the piston and to which the latch is attached.

The locking devices used come in addition to the means used for opening and closing the mold.

Therefore, in addition to the locking force normally applied by the opening and closure means in order to prevent the mold from opening during the injection of material, an additional locking force is applied by the locking device according to the invention. It therefore becomes possible to mold parts which require the application of a greater locking force than the nominal locking force of the opening and closure means in question, the difference being applied by the locking devices that are fitted to the mold.

Advantageously, the two half-molds are fitted with at least one locking device.

Even though, in the preferred embodiment, one cylinder is provided per latch, it is possible to envisage using several cylinders per latch.

According to one variant, the chamber of the cylinder is attached to a support coupled to the half-mold.

According to another variant, the chamber of the cylinder or the support to which this chamber is attached is coupled at least to the side portion of the half-mold.

According to a noteworthy modality of the invention, the thrust axis of the cylinder corresponds to the axis of movement of the latch. This means in particular that the thrust axis of the cylinder and the axis of movement of the latch are parallel or indistinguishable.

In a variant of the invention, a first half-mold is designed to be associated with a fixed platen and a second half-mold is designed to be associated with a movable platen. One and/or the other of the platens and/or of the half-molds is/are fitted with means for injecting material to be molded and means for ejecting a molded part.

The locking devices used come in addition to the press usually coupled to the half-mold associated with the movable platen. Therefore, in addition to the locking force normally applied by the press to prevent the mold from opening during the injection of material, an additional locking force is applied by the locking device according to the invention.

In a variant of the invention, the locking device is coupled to one of the half-molds.

In a variant of the invention, the standalone system comprises a cylinder, for example a hydraulic cylinder. It may be a conventional cylinder or a self-locking cylinder. According to a first variant, the cylinder comprises a chamber fixed to a support coupled to a half-mold, a piston capable of moving in said chamber and a rod which is secured to the piston and to which the latch is attached. According to a second variant, the cylinder comprises a chamber coupled to a half-mold, a piston capable of moving in said chamber and a rod which is secured to the piston and to which the latch is attached.

In another variant of the invention, the locking device also comprises means for guiding the latch.

In another variant of the invention, the latch has a shape to match that of the recesses in which it is to be housed.

In another variant of the invention, each recess of a half-mold is positioned in symmetry with a recess of the other half-mold relative to the parting line.

In another variant of the invention, each recess has an opening, a bottom, two end faces substantially orthogonal to the parting line, and two opposite side faces. The opposite side faces are between the opening and the bottom of the recess. The side face closest to the parting line forms an angle with the parting line so that the distance between the opposite side faces increases from the bottom to the opening of the recess. According to a first variant, said angle is less than or equal to 20°.

The following description will explain in detail the features and advantages of the invention with reference to the figures. The detailed description, while indicating preferred variants of the invention, is supplied solely to illustrate the invention.

BRIEF DESCRIPTION OF THE FIGURES

The invention will now be described in detail with the aid of examples which will make reference to the appended figures, amongst which:

FIGS. 3a and 3b represent a view in perspective of a variant of a locking device according to the invention, respectively a rear face view (FIG. 3a) and a view of the mold side (FIG. 3b).

FIG. 5 represents a view in side elevation of a variant of a locking device.

FIG. 6 represents a view in elevation from above of the variant of the locking device of FIG. 5.

FIG. 7 represents a detail of FIG. 4c delimited by the frame VII.

DETAILED DESCRIPTION OF THE INVENTION

Figure 1:
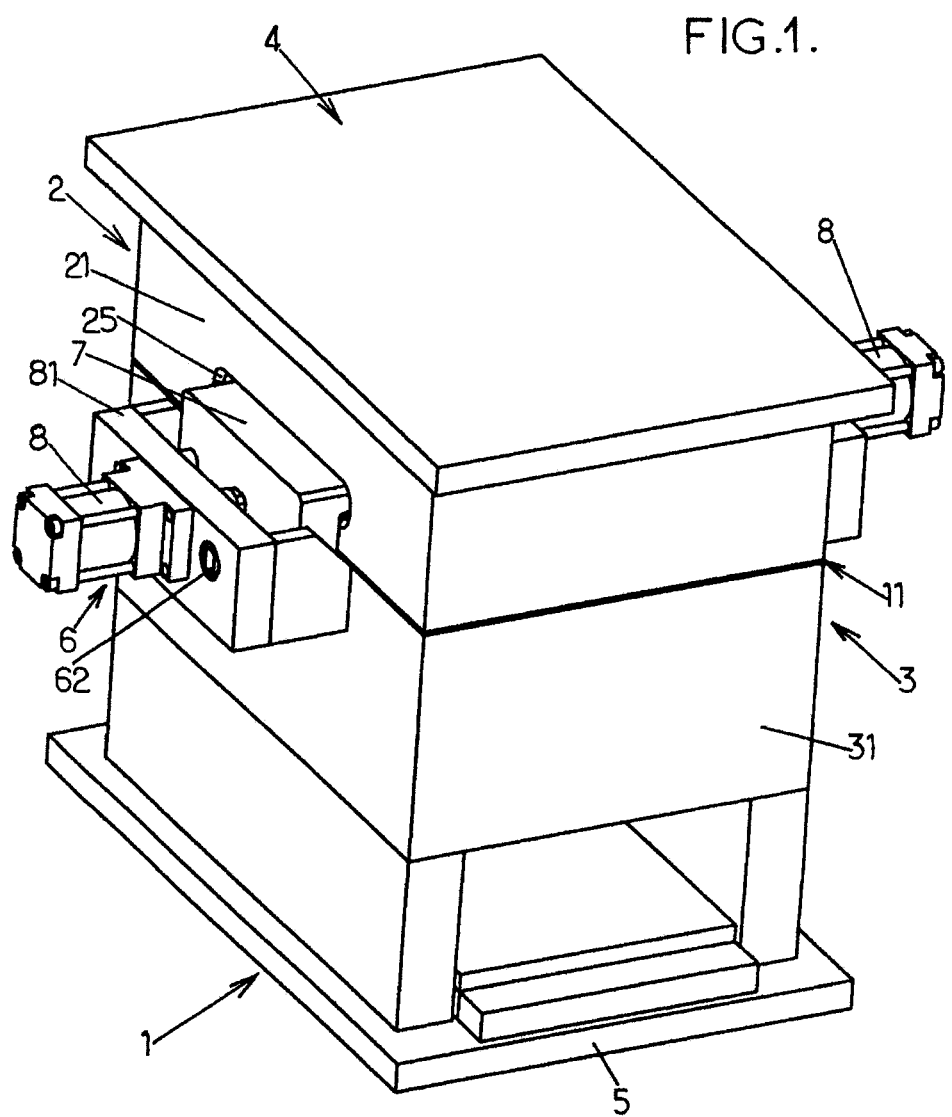
FIG. 1 represents a view in perspective of a variant of a mold according to the invention, in the closed position.

It should be noted that the singular definite or indefinite articles, in the description and the claims, must also be understood to be plural articles, unless the context clearly dictates a contrary interpretation. Unless otherwise mentioned, the reader should attribute to the technical and scientific terms employed their meaning that is commonly accepted by those skilled in the art.

In the rest of the description, the term "movable half-mold" will refer to the half-mold designed to be associated with the means used to open and close the mold. For example, in the case of injection molding, it may be a movable platen coupled to a hydraulic press. In certain variant embodiments, the means for opening and closing the mold may include a hoist system. Similarly, the term "fixed half-mold" will make reference to the other half-mold which is usually fixed. That said, certain installations comprise one movable half-mold and two "fixed" half-molds placed on a trolley. This makes it possible to carry out certain operations in concurrent operating time on one of the "fixed" half-molds while producing a molded part with the movable half-mold and the other "fixed" half-mold. The fixed half-mold can be placed on the ground, on a support. It may also be designed to be associated with a fixed platen to which certain items of equipment of the molding system are fitted.

In the rest of the description, the expression "inclined face of the recess" will refer to the side face of the recess that is closest to the parting line and that makes an angle, marked A, with the parting line. The expression "opposite side face" will refer to the side face of the recess that is opposite to the inclined face of the recess.

Moreover, to simplify the description, reference will be made to a variant of the invention in an injection molding system. In this variant, the fixed half-mold and the movable half-mold are associated respectively with a fixed platen and with a movable platen. The fixed platen and the fixed half-mold are fitted with means for injecting material to be molded. The movable platen and the movable half-mold are fitted with means for ejecting a molded part. Since the invention does not relate specifically to these items of equipment of a mold, but to a locking device, the invention cannot be limited to this variant. In particular, those skilled in the art know various ways, on the one hand, to place material in the mold, particularly by deposit, by injection or else by injection-compression, and on the other hand, to eject the molded part. For example, those skilled in the art can produce molds, particularly for injection molding or for injection-compression molding, in which the injection of material is carried out in the movable half-mold or even, for the production of bimaterial parts, both in the fixed half-mold and in the movable half-mold. Moreover, the means for ejecting the molded part can be fitted to one or other of the two half-molds or even to both of them. Other details concerning the manufacture of molds, particularly for injection molding, are known to those skilled in the art, for example for the production of complex three-dimensional structures or of openings. Nor will the description include details on the hydraulic circuits necessary for opening or closing the mold or for ejecting a molded part. These are manufacturing details well known to those skilled in the art.

Figure 2:
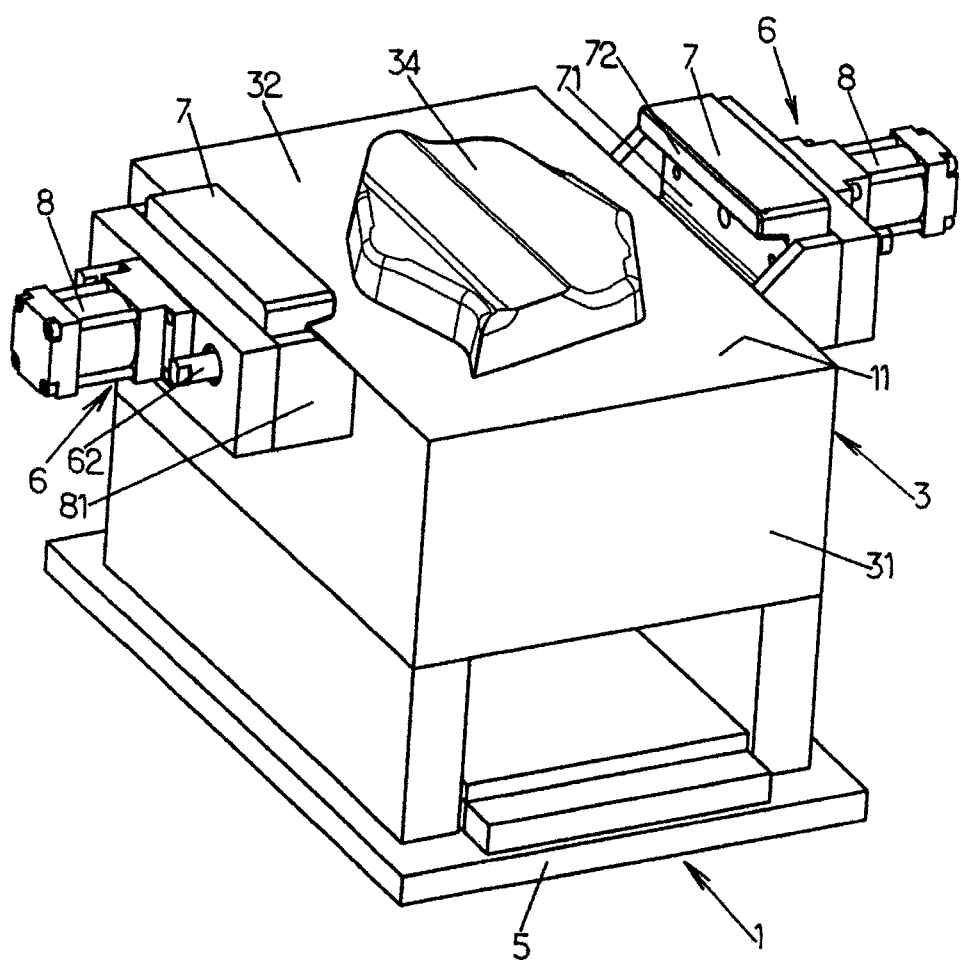
FIG. 2 represents a view in perspective of the mold variant of FIG. 1, in which the half-mold designed to be associated with a fixed platen does not appear.

FIGS. 1 and 2 represent views in perspective of a variant of a mold 1 comprising a fixed half-mold 2 and a movable half-mold 3 respectively associated with a fixed platen 4 and a movable platen 5. The fixed half-mold 2 is defined by a side surface 21, a front face 22 and a rear face 23. The movable half-mold 3 is defined by a side surface 31, a front face 32 and a rear face 33. The front face 22, 32 of the half-molds 2, 3 supports a cavity 24, 34, which cavities match one another. When the mold is closed, as illustrated in FIGS. 1 and 4c, the two half-molds are in contact at a parting line 11 which is substantially perpendicular to the direction of opening and of closure of the mold 1. A cavity volume is defined between the cavities 24, 34. This volume will be filled with material to be molded, in order to manufacture the desired part.

For example, the fixed platen 4 and the fixed half-mold 2 are fitted with means for injecting material to be molded. This may be a nozzle which leads onto the front face 22 of the fixed half-mold 2, in the cavity 24. By contrast, it may be the movable half-mold 3 and the movable platen 5 that are fitted with means for injecting material to be molded, in an arrangement comparable to that described above. Finally, in certain installations, particularly when it is desired to manufacture bimaterial molded parts, several injections of material may be necessary.

Usually, upstream of the injection means, the installation for manufacturing molded parts comprises a metering screw which makes it possible to convey the material to be molded in pasty form, in a quantity that is predetermined as a function of the cavity volume and of the shrinkage of the material on cooling.

The movable platen 5 is fitted with means for the opening and closure of the mold 1, which can be coupled to a press. The function of the press is to keep the mold 1 closed during the injection of material to be molded. Specifically, to ensure a good filling of the cavity volume, the injection pressure may be particularly high and it is essential to apply a locking force that makes it possible to counter the injection pressure in order to prevent any distortion of the molded parts.

After the injection of the material to be molded, the part should be left to cool. Accordingly, the mold is fitted with a cooling system, not shown, which is a manufacturing detail known to those skilled in the art. Then, once the part is sufficiently stiff, the mold 1 is opened and the molded part is ejected. Usually, the moment of opening the mold 1 is determined as a function of the speed of cooling of the part and of the stripping temperature. In the case of injecting plastic, the stripping temperature is chosen to be below the glass transition temperature of the material used. In the case of injecting metal or metal alloy, the stripping temperature is chosen to be below the solidification temperature of the metal, or of the alloy, used. Below the stripping temperature, the part is sufficiently stiff. To carry out ejection, the fixed half-mold 2, the movable half-mold 3 or both half-molds are fitted with ejection means which are also manufacturing details known to those skilled in the art.

To supplement the locking force, the mold 1 is fitted with at least one locking device 6 which comprises a latch 7 and a standalone system capable of bringing the latch 7 toward or away from the recesses 25, 35 in which the latch 7 is to be housed. In the variants shown in FIGS. 1 to 4c and in FIG. 7, said standalone system is a hydraulic cylinder 8. According to a variant not illustrated, the hydraulic cylinder is a self-locking cylinder. In other variant embodiments, it is possible to envisage the use of a pneumatic cylinder. A pneumatic cylinder is usually less powerful than a hydraulic cylinder so that this possibility must be reserved for installations in which the required locking force is low. It is also possible to envisage installing a motorized system rather than a cylinder.

A locking device is shown in perspective in FIGS. 3a and 3b. In this variant, the latch 7 comprises an elongate body 71 and two longitudinal tenons 72, 73 so that the latch 7 has an overall C-shaped profile. The tenons 72, 73 are designed to house in the recesses 25, of each of the half-molds 2, 3.

In the variants illustrated in the various figures, the recesses 25, 35 are positioned in symmetry two by two, on either side of the parting line 11.

That said, other variants can be envisaged. For example, a first half-mold may be furnished with two adjacent recesses, the second half-mold with a single recess in a position situated substantially in line with and between the two recesses of the first half-mold. In this variant, the latch comprises a body and three teeth designed to house in the three recesses described. Such a latch is therefore comparable to a claw with three branches.

The hydraulic cylinder 8 conventionally comprises a chamber 82, a piston and a rod 83. One end of the rod 83 is secured to the piston, which moves in translation in the chamber 82 in a direction 61 for locking and for opening the locking device 6, under the effect of the inflow or outflow of liquid in the chamber 82. In the variants illustrated in the various figures, the other end 84 of the rod 83 of the cylinder 8 is attached to the latch 7. Moreover, the chamber 8 is attached to a support 81 coupled to only one of the half-molds 2, 3. Therefore, when the latch 7 is housed in the recesses 25, 35 of the half-molds 2, 3, in other words when the locking device 6 is locked, the rod 83 of the cylinder 8 is positioned out of the chamber 82 of the cylinder 8. By contrast, when the locking device 6 is open, the rod 83 of the cylinder 8 is positioned in the chamber 82 of the cylinder 8.

In another variant, the cylinder comprises a chamber coupled directly to one of the half-molds, a piston capable of moving in said chamber and a rod of which one end is secured to the piston and the other end is secured to the latch. In this case, when the locking device is locked, the rod is positioned in the chamber. When the locking device is open, the rod of the cylinder is positioned out of the chamber.

According to a variant of the invention, the locking device 6 also comprises means for guiding the latch 7. For example, this involves guide bars 62, known to those skilled in the art.

In a variant of the invention, a half-mold supports at least two locking devices 6. It is preferable that these devices be distributed in a balanced fashion around the half-molds, for example around the side surface 21, 31 of the half-molds. For example, if the mold 1 comprises two locking devices 6, the latter are placed substantially in symmetry with one another with respect to the direction 12 of opening and closing the mold 1. A perfect symmetry is not absolutely necessary. However, it is preferable that the locking force of the locking devices 6 is substantially balanced around the mold 1.

In general, it is envisaged that the locking devices 6 are installed in pairs, but this is not always possible, because of the space requirement around the mold in the installation for manufacturing molded parts.

Moreover, it is possible to combine several cylinders 8 in parallel with a single latch 7.

Let us consider the recesses 25, 35. A substantially parallelepipedal recess has an opening 27, 37 and a bottom 28, 38 and end faces substantially orthogonal to the parting line 11. The recesses 25, 35 have two opposite side faces, situated between their opening 27, 37 and their bottom 28, 38. One of these side faces is closer to the parting line 11 than the other. To prevent the jamming of the latch 7 in the recesses 25, 35, it is possible to arrange for these side faces 26, 36 close to the parting line 11 to be inclined relative to the parting line 11 and to form an angle A with the parting line 11 so that the distance between said opposite side faces increases from the bottom to the opening of the recess. Preferably, the angle A is less than or equal to 30°. Usually the angle A is between 2° and 20° inclusive, or even between 3° and 10° inclusive. The minimum angle depends in particular on the sliding qualities of the latch on the side face closest to the parting line.

That said, the greater the angle A, the lesser will be the resultant of the locking force of the locking device 6, in the direction 12 of opening and of closure of the mold. Consequently, it is preferable to choose an angle A that is as small as possible. It is therefore necessary to reconcile one objective which is to prevent the jamming of the latch 7 in the recesses 25, 35 with an objective which is to transmit a resultant locking force that is as high as possible.

In general, it is preferable that the latch 7 has a shape that matches that of the recesses 25, 35 in which it is to be housed. In the situation described above, the tenons 72, 73 each have an inner face 74, 75 designed to be facing the inclined faces 26, 36 of the recess 25, 35. The inner faces 74, 75 are also inclined at an angle A relative to the parting line 11.

To improve the sliding properties of the inclined faces 26, 36 of the recesses 25, 35, and those of the inner faces 74, 75 of the tenons 72, 73, it is possible for them to comprise bearing plates made of a material the sliding properties of which are better than those of the material of the half-molds 2, 3 or of the latch 7. Moreover, the bearing plates may constitute wearing parts, which prevents damaging the parting line 11.

The figures represent a locking device, in which figures the latch is a mechanical part, usually in a block, which is housed in recesses provided in the side surface of the half-molds. That said, a variant of the invention consists in using a magnetic latch comprising an electromagnet. The use of an electromagnet makes it possible to control the locking and unlocking of the device.

The operation of the mold 1 fitted with locking devices 6 will now be described with reference to FIGS. 4a, 4b and 4c, with reference to an injection-molding system.

Figure 4A:
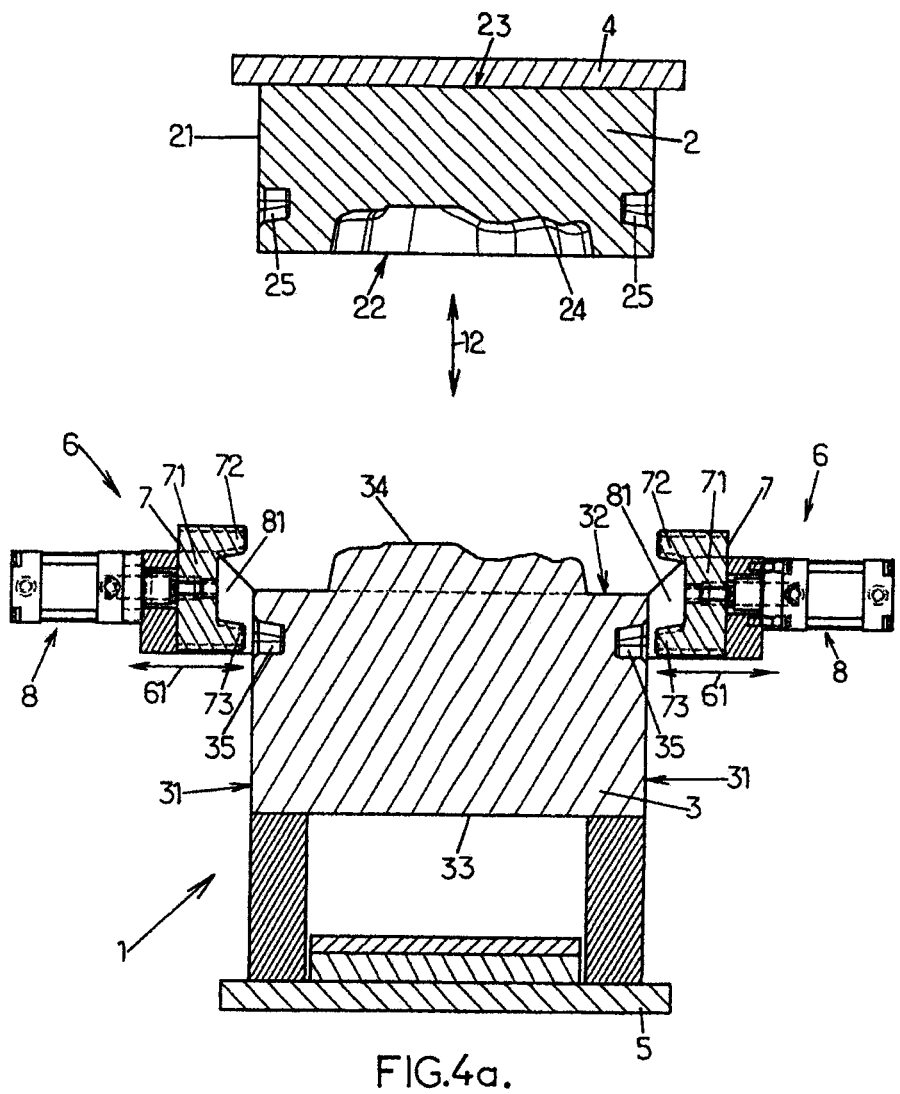
FIGS. 4a, 4b and 4c represent views in section of the variant of FIGS. 1 and 2, illustrating the operation of a mold fitted with a locking device according to the invention, respectively viewed when open (FIG. 4a), being locked (FIG. 4b) and locked (FIG. 4c).
Figure 4B:
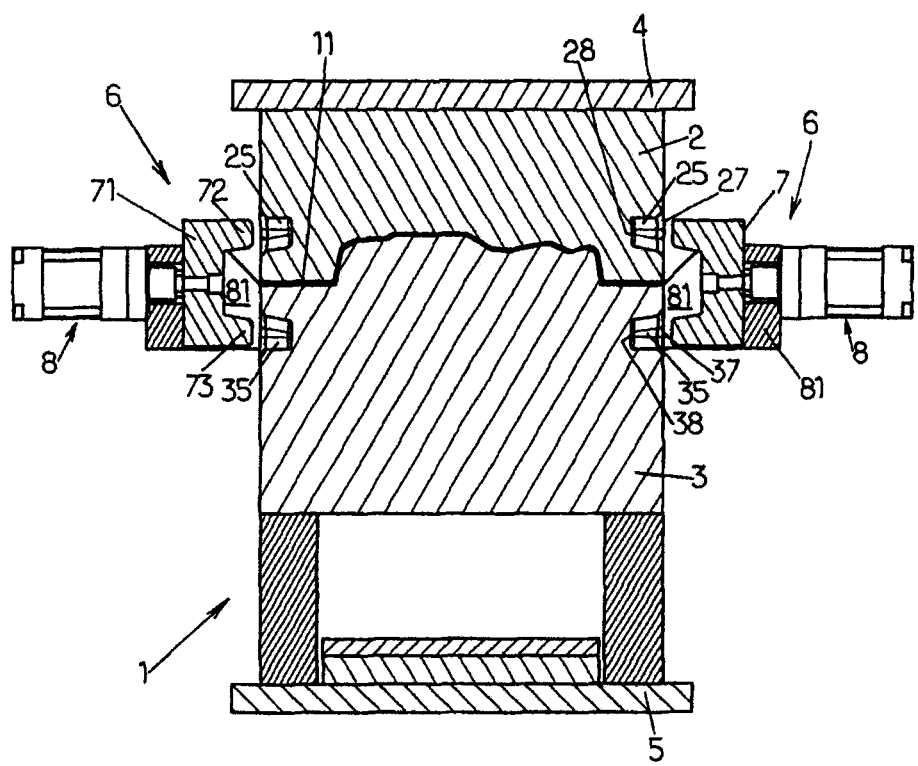
Figure 4C:
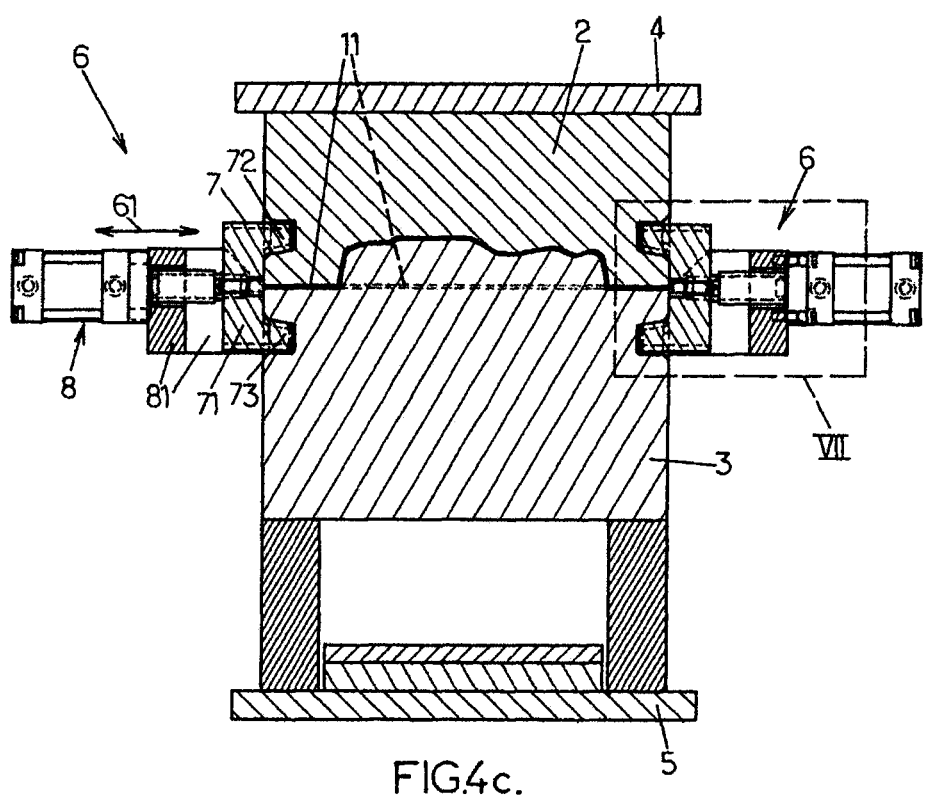

First of all, the mold 1 is open, as illustrated in FIG. 4a. This means, on the one hand, that the half-molds 2, 3 are separated from one another, and, on the other hand, that the locking devices 6 are in the open position.

Then, by virtue of means for opening and closing the mold, the movable half-mold 3 and the movable platen 5 move toward the fixed half-mold 2 and the fixed platen in the direction 12 of opening and of closing the mold, until the half-molds are adjacent at the parting line 11. This then brings us to the position shown in FIG. 4b.

The injection of material to be molded can then begin. Before the beginning of the injection, or at the same time, the locking devices 6 are actuated in order to move the latches 7 toward the recesses 25, 35 in which they are to be housed, in the direction of locking 61. In other words, either the operations of locking and of injection of material are carried out in series, one after the other, or they are carried out in parallel. In the latter case, it is possible to shorten the duration of the production cycle of the molded parts, but this requires a fine adjustment of the operations carried out in parallel.

This leads to the position shown in FIG. 4c, either before the beginning of the injection of material to be molded, or before the peak of pressure inside the mold is reached.

This peak of pressure is normally reached when the volume of injected material is equivalent to that of the cavity volume and when additional material begins to be injected in order to pack the cavity volume.

Therefore, FIG. 4c shows a closed mold with locking devices 6 in the locked position. Once the volume of material to be injected is reached, injection is stopped.

Then the cooling of the molded part begins. When the stripping temperature is reached, the latches open. This leads to a position that is identical to that of FIG. 4b. Then, the mold is opened, followed by the part being ejected. This then leads to the open position illustrated in FIG. 4a. The molding cycle can then recommence. Therefore, a subject of the invention is also a method of molding which comprises a step of locking a locking device described above.

The following claims define the essential features of the invention. They cover various embodiments which have not been described but which those skilled in the art could achieve without particular difficulty.

The invention claimed is:

1. A mold for molding comprising two half-molds each defined by a side surface, a front face and a rear face, at least one of the two half-molds being designed to be associated with means for carrying out the opening and the closure of the mold, the front faces of the two half-molds being capable of coming into contact at a parting line when the mold is closed,
   wherein each of the two half-molds has at least one recess arranged on the side surface, said recesses extending parallel to each other, each of said recess having an opening, a bottom, two end surfaces substantially orthogonal to the parting line, and two opposite side faces, between the opening and the bottom, the parting line being closer to one side face than to the other, the parting line and the closer side face defining an angle (A) between 2° and 20°,
   wherein at least one of the two half-molds is fitted with at least one locking device comprising:
      at least one latch made in one block having a C-shaped section to match the at least one recess of each half-mold, said latch comprising two tenons extending parallel to each other and capable of being housed respectively in the recesses of the half-molds, each tenon having an inner surface comprising a bearing plate comprising a slidable material and an outer surface opposite to the inner surface, the inner surface arranged to contact the side surface of the recess closer to the parting line, wherein when the tenons are housed respectively in the recesses of the half-molds, the outer surface of at least one tenon contacts the side face of the recess farther from the parting line; and
      at least one standalone system capable of bringing the latch toward and away from the recesses and comprising a cylinder comprising a chamber attached to a support coupled to the side surface of at least one of the two half-molds, a piston capable of moving in said chamber and a rod secured to the piston and to which the latch is attached, the cylinder can move the piston in translation along a thrust axis, the rod being positioned out of the chamber when the locking device is closed, and positioned in the chamber when the locking device is open.

2. The mold as claimed in claim 1, wherein the thrust axis of the cylinder corresponds to an axis of movement of the latch.

3. The mold as claimed in claim 1, wherein a first half-mold of the two-half molds is designed to be associated with a fixed platen, a second half-mold of the two half-molds is designed to be associated with a movable platen, at least one of the platens or at least one of the half-molds being fitted with means for injecting material to be molded and means for ejecting a molded part.

4. The mold as claimed in claim 1, wherein each recess of a first half-mold of the two half-molds is positioned in symmetry with the recess of a second half-mold of the two half-molds relative to the parting line.

5. The mold as claimed in claim 1, wherein the thrust axis extends substantially along the parting line.

6. The mold as claimed in claim 1, wherein the angle (A) is between 3° and 10°.

* * * * *